Dec. 16, 1969　　　　R. S. JOHNSON　　　　3,484,062
AERIAL DISPENSING APPARATUS

Filed Oct. 3, 1967　　　　　　　　　　　　3 Sheets-Sheet 1

INVENTOR
RALPH S. JOHNSON
BY
ATTORNEY

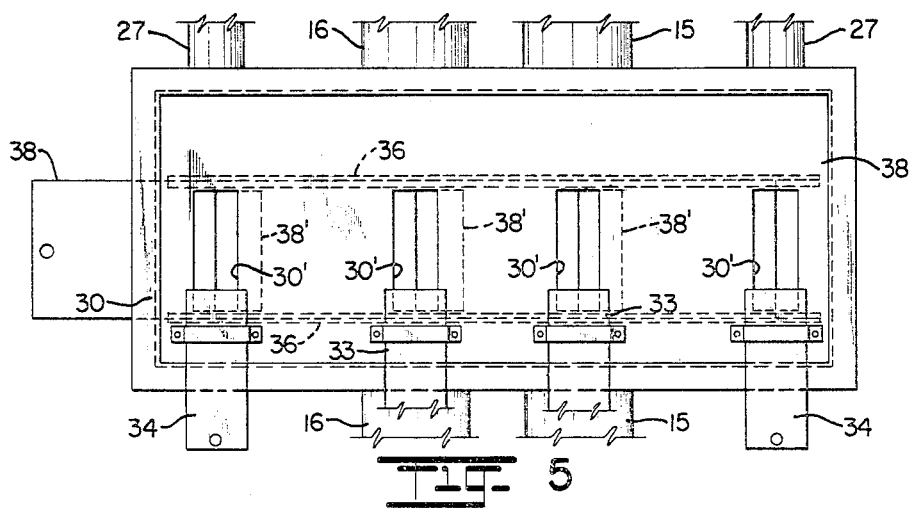
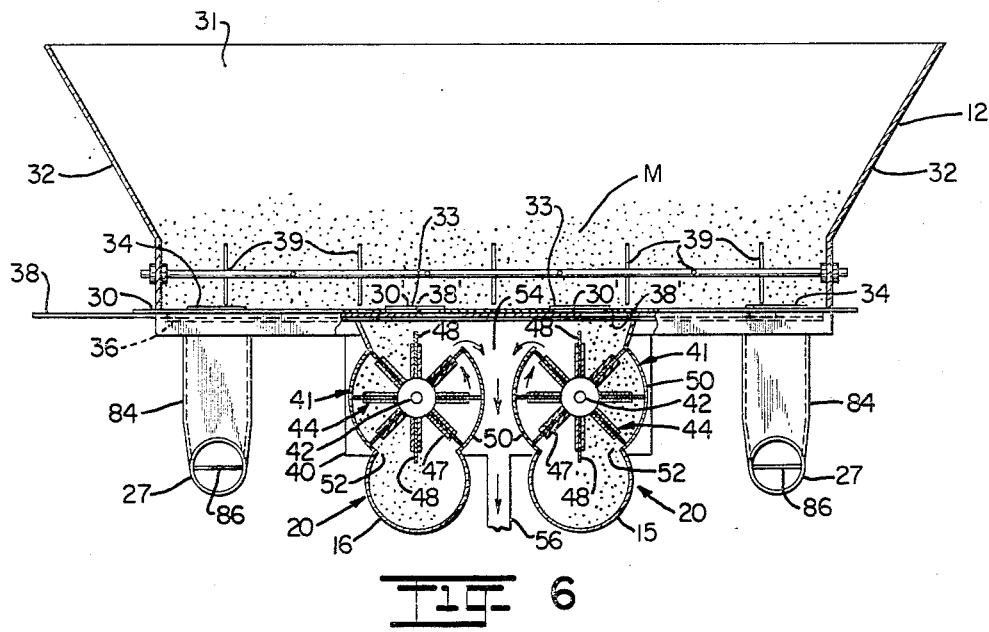
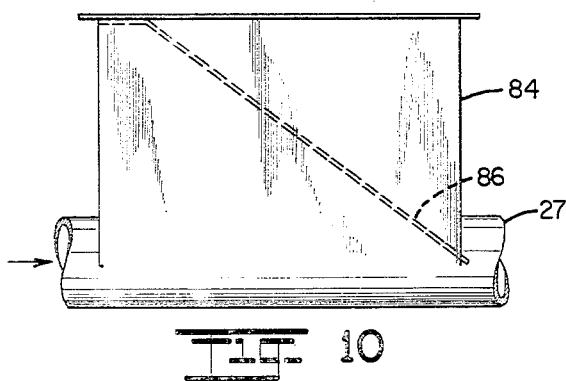

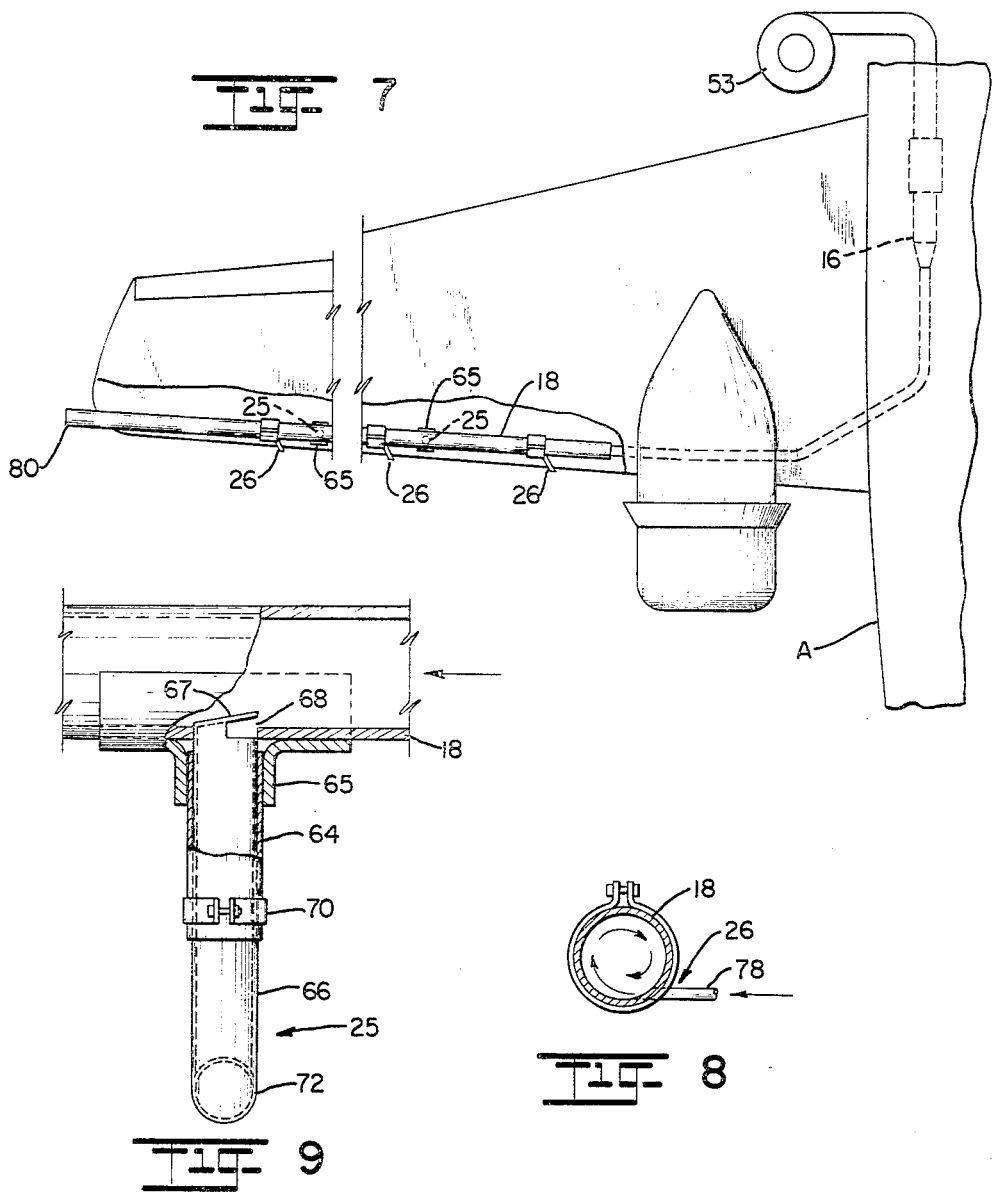

United States Patent Office 3,484,062
Patented Dec. 16, 1969

3,484,062
AERIAL DISPENSING APPARATUS
Ralph S. Johnson, 907 Frontier Park Ave.,
Cheyenne, Wyo. 82001
Filed Oct. 3, 1967, Ser. No. 672,521
Int. Cl. B64d 1/18; B05b 17/02
U.S. Cl. 244—136                                    20 Claims

ABSTRACT OF THE DISCLOSURE

An aerial crop dusting apparatus has a rotor member interposed between a gravity feed hopper for a granular material and an air discharge duct for the purpose of accurately metering and advancing the material from the hopper into a rapidly moving airstream passing through the duct while completely isolating the hopper from the duct member. In order to effect most uniform and efficient distribution of the material over the widest possible area, the airstream carries the material forwardly and laterally away from the fuselage of the aircraft through delivery ducts extending along the leading edge of each wing. Each of the delivery ducts has at spaced intervals therealong a series of adjustable outlets in which the extent of projection of a slotted portion in each outlet into the interior of the delivery duct determines the relative amount of material drawn by the outlet from the moving airstream. Air is forced at a high velocity past the rotor member through the delivery ducts, and means are provided both in the main air and delivery ducts to maintain the material in suspended form to prevent its collection along the bottom of the ducts. Auxiliary ducts may be connected in direct communication with the hopper to discharge material along either side of the fuselage section.

This invention relates to a novel and improved aerial dispensing apparatus, and more particularly relates to aerial crop dusting apparatus being especially adaptable for use in dispensing powdered or granular insecticide materials uniformly over a relatively wide area from an aircraft in a reliable and highly dependable manner.

An object of the present invention is to provide for a highly effective yet simplified form of dispensing apparatus which is conformable for use in different aircraft, the apparatus being comprised of a minimum number of parts, relatively light in weight and readily adjustable for the purpose of dispensing predetermined amounts of material over selected areas of distribution.

It is another object of the present invention to provide for aerial dispensing apparatus which can be preset to selectively increase or decrease the amount of material to be discharged as well as to maintain uniform distribution in a positive, dependable manner.

It is a further object of the present invention to provide in aerial dispensing apparatus for an improved form of feed control means capable of accurately metering and advancing granular material from a feed hopper into a rapidly moving airstream while maintaining complete isolation between the hopper and airstream; further to provide in apparatus of the type described for improved air discharge means to conduct the material from the fuselage section of the aircraft through delivery ducts along the wing section in such a way as to prevent its collection along the bottom of the delivery ducts and to effect more uniform distribution of the material through outlets located at spaced intervals along the ducts.

It is a still further object of the present invention to provide in aerial dispensing apparatus of the type described for a novel form of air discharge system which can be readily adjusted and closely controlled to deliver and discharge granular materials uniformly across the entire width of the aircraft or from selected sections of the aircraft.

In accordance with the present invention a ram air scoop reverses the direction of air flow and forces it at a high velocity forwardly in spaced relation beneath a gravity feed hopper into the fuselage section of the aircraft. A rotor member is provided with a series of radially extending vanes or blades and is positioned between the feed hopper and moving airstream to accurately meter the delivery of material from the hopper into the airstream while maintaining the desired air pressure conditions to permit the material to be drawn into the rotor section. Means are disposed in staggered relation within the air ducts to receive the material delivered by the rotor member and to hold it in suspended relation so as to be most effectively carried into the main body of the airstream for forward advancement at a high rate of speed into the delivery ducts along the wing sections of the aircraft. Most desirably the delivery ducts are disposed along the leading edges, and wing distribution outlets depending downwardly, at spaced intervals from the delivery ducts can be accurately preset to discharge predetermined amounts of material. Pick-up diffusers are also disposed at spaced intervals along each of the delivery ducts to aid in maintaining the material in suspension for most uniform distribution and dispensing of material through the wing outlets.

The hopper may be of sufficient width to accommodate auxiliary ducts which are in direct communication with the feed hopper on opposite sides of the main air duct and are provided with means to induce the flow of controlled amounts of the material from the hopper through the auxiliary ducts. In this relation, the hopper is additionally provided with adjustable gate members to selectively control relative amounts of material delivered into the main and auxiliary delivery ducts for most effective and uniform distribution of materials.

The above and other objects, advantages and features of the present invention will become more readily appreciated and understood from a consideration of the following detailed description of a preferred form of invention when taken together with the accompanying drawings, in which:

FIGURE 5 is a plan view in detail of the feed hopper outlet and of the feed rate adjustment means associated with the hopper.

FIGURE 6 is a cross-sectional view in detail of the feed hopper and metering device.

FIGURE 7 is a plan view schematically showing in more detail the air discharge system in one wing section of the aircraft.

FIGURE 8 is an enlarged sectional view of a material pickup diffuser.

FIGURE 9 is a detailed view partially in section of one of the outlets forming part of the air discharge system; and FIGURE 10 is an enlarged view of a portion of an auxiliary discharge duct in accordance with the present invention.

Figure 1:
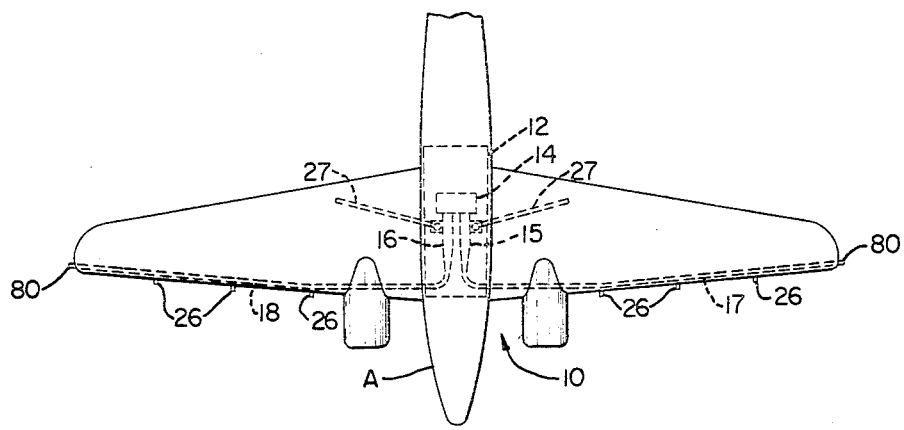
FIGURE 1 is a plan view of an aircraft schematically illustrating the disposition and arrangement of a preferred form of dispensing apparatus within the craft.
Figure 2:
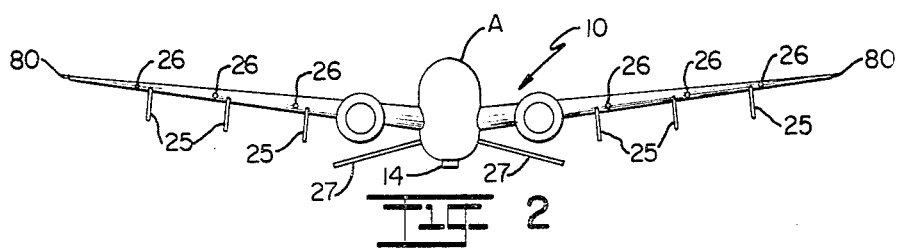
FIGURE 2 is a front elevational view of the aerial dispensing apparatus shown in FIGURE 1 particularly illustrating the disposition of the wing distribution outlets relative to the aircraft.
Figure 3:
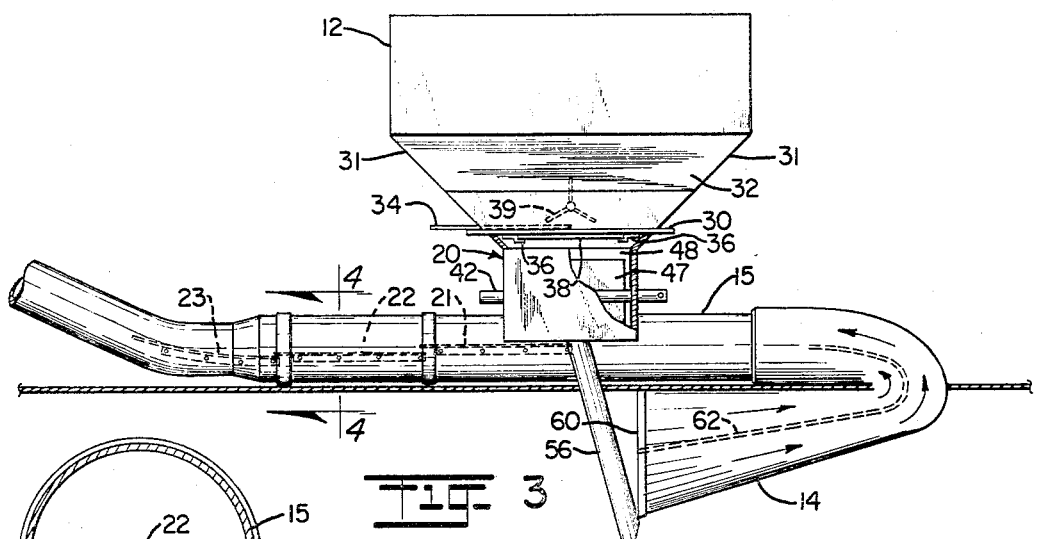
FIGURE 3 is an enlarged view illustrating the relative disposition between the feed hopper and a portion of the air discharge system, in accordance with the present invention.
Figure 4:
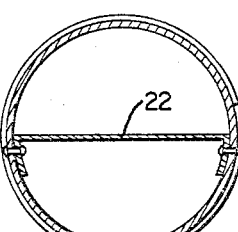
FIGURE 4 is a sectional view taken on line 4—4 of FIGURE 1.

Referring in more detail to the drawings, there is shown by way of illustrative example in FIGURES 1 to 3 an aerial dispensing apparatus 10 mounted on a conventional aircraft represented at A. Broadly, the dispensing apparatus 10 consists of a feed hopper or bin 12 positioned within the fuselage and being filled with a powdered or granular material M to be distributed from the aircraft. An air discharge system includes a ram air scoop 14 located centrally beneath the feed hopper and being adapted to force air forwardly at a high rate of speed through main air ducts 15 and 16 which branch into a pair of delivery ducts 17 and 18 extending through the wing structure along the leading edge of each wing section. Material is accurately metered from the feed hopper 12 and delivered into the rapidly moving airstream through the main air ducts by means of a metering device 20, and the material is held in suspended relation to travel with the main body of the moving airstream by means of accelerator trays 21, 22 and 23 arranged in staggered relation downstream of the feed inlet from the device 20. Wing outlets in the form of ejector tubes 25 are located at spaced intervals along the length of each of the main delivery ducts 17 and 18 and project downwardly from communication with the interior of the delivery ducts for ejection of the materials received from the main air ducts 15 and 16. Pick-up diffusers 26 are also located at spaced intervals along the delivery ducts to cooperate in suspending the granular materials in the airstream to prevent their collection along the bottom of the delivery ducts. If desired, the hopper may be provided with additional feed openings in direct communication with a pair of auxiliary discharge ducts 27 which extend laterally and rearwardly at a slight downward angle way from opposite sides of the hopper for discharging metered amounts of material from the feed hopper in cooperation with the delivery ducts 17 and 18. In a manner to be described, the feed rate of material through the main air ducts 15 and 16 and the auxiliary ducts 27 may be independently regulated at the hopper outlet.

Considering in more detail the construction of the material hopper 12, it is in general designed to most effectively utilize the capacity of the fuselage section of the aircraft and to encourage the downward movement of material toward an outlet section 30 for delivery into the air discharge system. In the form shown, the hopper is designed for storage of granular or powdered material and has downwardly convergent end and side walls 31 and 32, respectively, terminating in the common, generally rectangular outlet portion 30, the latter being divided into outlet ports 30′. As shown in FIGURES 3 and 5, the longer dimension of the outlet 30 extends transversely across the lower section of the fuselage, and pairs of inner and outer feed rate adjustment gates 33 and 34 are disposed in side-by-side relation across each of the respective outlet ports 30′ for slidable movement in a direction lengthwise of the fuselage, or in other words, normal to the longer dimension of the outlet portion 30. In the preferred form, the inner control gates 33 are slidable to adjust the rate of flow into the main air ducts 15 and 16, and the outer control gates 34 are regulated to control the rate of flow through the auxiliary ducts 27. Additionally, a main control gate 38 is carried by guide rails 36 for slidable movement across the hopper outlet beneath the control gates 33 and 34, and the control gate 38 is provided with openings 38′ movable into and out of alignment with the outlet ports 30′. An agitator 39 is positioned in the hopper directly above the outlets 30′ in order to encourage free downward passage of the material through the outlet ports.

The delivery or feed of material M from the hopper into each main air duct is controlled by the metering device 20 which in the preferred form comprises a rotary air lock including a common housing 40 for a pair of rotary impellers 41 driven in counter-rotation off a common source of power, not shown. Each of the impellers comprises a drive shaft 42 provided with radial extending blades or vanes 44 at spaced circumferential intervals about the drive shaft. As shown, each impeller blade 44 is of relatively flat, rectangular configuration, traversing the length of the shaft within the housing 40, and each blade is defined by a rigid support plate 47 which is slotted for insertion of a flexible seal 48 formed, for instance, of a rectangular strip of rubber or rubber-like material extending beyond the outer edges of each plate. The impellers 41 are mounted in spaced parallel relation within the rotor housing and each is bounded on opposite sides by semi-cylindrical wall sections 50. Wall sections 50 terminate at their upper edges along opposite sides of a downwardly convergent passage leading downwardly from the outlet ports 30′ controlled by the inner gates 33; and further, the wall sections 50 terminate at their lower edges on opposite sides of lower exhaust slot or opening 52 in the upper surface of one of the main air discharge ducts. The impeller blades are disposed between wall sections 50 such that the outer flexible extensions 48 effect sealed engagement with the inner surfaces of the wall sections 50 and the ends of the rotor housing in advancing upwardly, in the direction shown in FIGURE 5, toward the outlet ports 30′, then the blades pass across the outlet ports 30′ to advance material deposited between the blades downwardly toward the opening 52. As material is deposited in the main air ducts from the space between each pair of adjacent impeller blades, air is entrapped within the space between blades and carried upwardly toward the outlet ports 30′. Accordingly it is desirable and has been found to be highly effective to provide a common space 54 between the impellers communicating with an evacuator tube 56, the latter depending downwardly and rearwardly from the space 54 to effect removal of entrapped air from the spaces between the impellers. Removal of the air in this manner avoids a high pressure condition at the outlet ports 30′ which would otherwise interfere with free downward passage of the material from the hopper.

The air discharge system may be provided with various means for forcing air at a high velocity past the metering device in order to carry the material into the delivery ducts 15 and 16. In the preferred form, the main air ducts are provided with a common ram air scoop 14 of generally U-shaped configuration, the lower portion of the scoop being forwardly divergent and terminating in a flared, relatively wide-mouthed entrance 60 provided with a central divider 62 facing in the direction of flight. Air is forced rearwardly under pressure through the lower section of the scoop then caused to undergo a reversal in direction of flow coupled with an increase in velocity through the forwardly convergent upper section of the scoop and branches into the main air ducts 15 and 16 past the exhaust openings 52 of the metering device 20. Of course other suitable means may be utilized, such as, the compressed air source 53 represented in FIGURE 7 to develop the necessary flow rate of air past the metering device 20, although utilization of an air scoop as described has been found to be a simplified but highly effective means of developing a rapidly moving airstream.

As best seen from FIGURES 3 and 4, accelerator trays 21, 22 and 23 are positioned in each of the main air ducts 15 and 16 in staggered relation downstream of the opening 52 from the metering device. Each tray is of elongated rectangular form with the rearward tray 21 traversing the width of the main air duct across its midsection and being located directly beneath the outlet. In turn, the trays 22 and 23 are located successively in downwardly stepped relation from the tray 21 and across the width of the main air duct so that material dispensed through the opening in the metering device is collected and advanced along the trays for gradual removal by the airstream. Thus, the trays prevent collection of material along the bottom of the duct away from the main path of flow and permit the airstream to pass between the trays and accelerate movement of materials into the ducts 17 and 18 so as to result in uniform dispersion of the particles into the airstream.

Most desirably, the delivery ducts 17 and 18 are defined by relatively thin-walled conveyor tubes converging laterally and outwardly within the wing sections along the leading edges so as not to affect the airstream passing over the wing surfaces. As best seen from FIGURES 6 and 7, each ejector tube 25 is defined by an outer stationary tubular member 64 mounted within a sleeve 65 and an inner telescoping tubular member 66 extending downwardly through the member 64. The inner tubular member 66 has an upwardly inclined cover plate 67 and a cut-away or slotted portion 68 at its upper end projecting into the interior of the delivery tube and facing inwardly to intercept the flow of moving particles from the main air duct. An adjustable clamp 70 is disposed at the lower end of the member 64 to adjust the extent of upward projection of the slotted portion 68 into the delivery tube, and in turn the lower end of the tubular member 66 includes a rearwardly directed elbow portion 72 to discharge material from the tube. Thus each ejector tube 25 may be adjusted in length and in extent of projection of its slotted portion into the path of flow whereby to determine the amount of material to be drawn from the airstream. For example, in outward progression away from the fuselage each ejector tube may have a slotted portion of successively greater opening size outwardly along the delivery ducts so as to intercept different sectors of the moving airstream.

Cooperating with the ejector tubes 25 are a series of material pick-up diffusers 26 each being defined by a tubular section 78 projecting forwardly and at a slight angle to normal from the undersurface of the delivery ducts so as to direct air into the delivery ducts and encourage the air to follow a spiral path of flow along the wall surface of the ducts. In this way, material dropping out of the moving airstream is re-established and retained in the main body of the moving airstream. In addition, wing tip ejector tubes 80 are provided for ejection of any material remaining in the airstream at the outer extremity of the wing as well as to establish a path of flow throughout the entire length of the delivery tube in each wing section.

In order to effect uniform distribution of material across the entire span of the aircraft, the auxiliary discharge tubes 27 extend rearwardly and at a slight downward angle away from the outlet ports 30' covered by the outer control gates 34. As shown in FIGURE 10, each auxiliary duct is provided at its forward end with an inlet housing 84 aligned beneath each of the outer control gates 34 and each housing has a rearwardly and downwardly extending baffle plate 86 which terminates at its lower edge in spaced relation above the lower surface of the duct 27 to form a restricted clearance space for movement of air from the open, forward end of the duct past the lower terminal edge of the baffle plate to encourage the withdrawal of material from the hopper.

In use, the hopper 12 is filled with a granular or powdered material M through a suitable access door provided in the fuselage. The feed rate adjustment gates 33 and 34 are preset to the desired opening position, and the main control gate 38 is held in the closed position until the aircraft is airborne. Although not shown, suitable remote control means may be provided to regulate opening and closing of the main control gate 38. Moreover, the ejector tubes 25 are adjusted to position the slotted inlets 68 at the desired setting within the conveyor ducts 17 and 18, and this setting will generally vary in accordance with the type or size of material to be dispensed and the intended flight speed of the aircraft as well as the opening size of the hopper outlet ports 30' into the metering device.

In flight, when the aircraft reaches the starting point for each run, the main control gate 38 is opened by advancing its openings 38' into alignment with the outlet ports 30', and the agitator and metering device 20 are energized to initiate delivery of material into the main air ducts 15 and 16. The airstream developed by the ram air scoop 14 in sweeping across the accelerator trays 21–23 will pick up the material and advance it through the delivery ducts where the material is discharged through the ejector tubes 25. The material pick-up diffusers 26 will cooperate to maintain the particles in the main body of the airstream in passing through the conveyor ducts and to encourage even distribution of the material through each of the ejector tubes. It can be determined by trial-and-error whether even distribution is being obtained through the auxiliary and main air ducts and suitable adjustments may be made at the control gates as well as in the speed of rotation of the metering device 20 to achieve uniform distribution. Between runs the dispensing apparatus may be closed off by de-energizing the metering device and closing the main control gate 38.

It will be apparent that the main discharge system through the wing sections may be used independently of the auxiliary ducts, or vice versa, depending upon the type of material to be distributed and the width of distribution desired. It is therefore to be understood that while there is illustrated and described herein a preferred embodiment of the present invention, various changes and modifications may be made in the detailed construction and arrangement of parts as well as the size and type of material dispensed without departing from the spirit and scope of the present invention.

What is claimed is:

1. In aerial dispensing apparatus for granular materials and the like having a material storage hopper disposed in the fuselage, delivery means in the wings of the aircraft with air discharge means adapted to force air under pressure from centrally beneath the hopper outwardly through the delivery means, the combination therewith of transfer means between the hopper and air discharge means to effect the controlled withdrawal of the material from the hopper into the air discharge means including feed rate adjustment means to regulate the delivery of material from said hopper and a pair of rotary impellers interposed in side-by-side relation between the hopper and the air discharge means for advancing discrete amounts of material from the hopper into the air discharge means while isolating the hopper from the air discharge means, and evacuator means associated with said transfer means to reduce the air pressure in the space between said impeller blades and said hopper outlet, and wing distribution outlets at spaced intervals along the delivery means having open inner ends projecting transversely into the path of the airstream through the delivery means for the removal of material therefrom.

2. In aerial dispensing apparatus according to claim 1, said transfer means including cylindrical wall sections bounding opposite sides of said rotary impeller and terminating in diametrically opposed openings in communication with the hopper and the air discharge means, and said feed rate adjustment means being disposed across the opening in communication with the hopper.

3. In aerial dispensing apparatus according to claim 1, further including suspension means defined by material pick-up diffuser tubes at spaced intervals along the external surface of said delivery means.

4. In aerial dispensing apparatus according to claim 3 said material pick-up diffuser tubes projecting forwardly at an angle to the delivery means to direct air in a spiral path along the internal surface of the delivery means whereby to re-establish material in the airstream.

5. In aerial dispensing apparatus according to claim 1, each of said wing distribution outlets including an outer fixed tubular member and an inner tubular member arranged in telescoping relation within said outer tubular member, said inner telescoping member including an upper slotted portion movable upwardly into the delivery means to intercept the flow of material therethrough.

6. In aerial dispensing apparatus according to claim 5, each of said wing distribution outlets further including means to adjustably control the extent of projection of the slotted portion of the said inner telescoping member into said delivery means.

7. In aerial dispensing apparatus according to claim 1, said air discharge means including a ram air scoop including a lower, forwardly divergent entrance facing in the direction of flight and an upper forwardly convergent duct section extending centrally beneath the feed hopper, said upper and lower sections being interconnected by a generally U-shaped section whereby to cause the air passing rearwardly through the entrance to undergo an increase in velocity and a reversal in direction of flow for passage through the upper duct section past said metering means.

8. In aerial dispensing apparatus according to claim 1, further including auxiliary discharge ducts extending downwardly and rearwardly away from communication with said hopper on opposite sides of said air discharge means for removal and distribution of material from the hopper independently of said transfer means.

9. In aerial dispensing apparatus for granular materials and the like, a gravity feed hopper including an outlet, an air discharge duct traversing the outlet from said hopper, and a metering device interposed between said hopper outlet and said air discharge duct including feed rate adjustment means to regulate the delivery of material from said hopper and a rotary impeller having impeller blades rotatable across said hopper outlet between said feed rate adjustment means and said discharge duct to receive the material in the clearance space between the blades and advance said material into said air discharge duct while sealing said hopper from open communication with said air discharge duct, and evacuator means associated with said metering device to reduce the air pressure in the space between said impeller blades and said hopper outlet.

10. In aerial dispensing apparatus according to claim 9, said rotary impeller further including a housing provided with cylindrical wall sections on opposite sides of said rotary impeller, each impeller blade being defined by a rigid plate and a flexible seal member mounted for extension beyond the outer edges of said plate to effect sealed engagement with the rotor housing.

11. In aerial dispensing apparatus according to claim 9, said air discharge duct further including at least one accelerator tray being adapted to receive material advanced by said metering device into said air discharge duct whereby to suspend the material for gradual removal and acceleration into the airstream flowing through said air discharge duct.

12. In aerial dispensing apparatus according to claim 9, said metering device comprising a pair of rotary impellers disposed in side-by-side relation between said hopper outlet and said air discharge duct.

13. In aerial dispensing apparatus according to claim 12, said air discharge duct member including branch ducts in communication with each of said rotary impellers for removal of material into each wing section of the aircraft.

14. In aerial dispensing apparatus according to claim 13, said hopper being a gravity feed hopper having downwardly convergent sides and end walls terminating in the outlet end, said outlet being divided into separate outlet ports, and said feed rate adjustment being defined by gates slidable across each of the outlet ports to regulate the flow rate of material from said hopper into each of said rotary impellers.

15. In aerial dispensing apparatus according to claim 12, said hopper outlet being divided into separate outlet ports above each of said rotary impellers, said feed rate adjustment means being defined by individual feed rate adjustment gates slidable across each of said outlet ports and a common control gate being slidable across said outlet ports independently of said feed rate adjustment gates.

16. In aerial dispensing apparatus for granular materials and the like having a material storage hopper disposed in the fuselage, delivery means in the wings of the aircraft with air discharge means adapted to force air under pressure from beneath the hopper outwardly through the delivery means, the combination therewith of transfer means between the hopper and the air discharge means to effect the controlled withdrawal of material from the hopper into the air discharge means, suspension mean disposed at spaced intervals along said delivery means to suspend the material in the air stream, said suspension means being defined by material pick-up diffuser tubes at spaced intervals along the external surface of said delivery means, and wing distribution outlets at spaced intervals along the delivery means for removal of material therefrom.

17. In aerial dispensing apparatus according to claim 16 said material pick-up diffuser tubes projecting forwardly at an angle to the delivery means to direct air in a spiral path along the internal surface of the delivery means whereby to re-establish material in the airstream.

18. In aerial dispensing apparatus for granular materials and the like having a material storage hopper, delivery means in the wings of the aircraft with air discharge means adapted to force air under pressure from centrally beneath the storage hopper outwardly through the delivery means, the combination therewith of transfer means between the hopper and the air discharge means to effect the controlled withdrawal of material from the hopper into the air discharge means, and wing distribution outlets at spaced intervals along the delivery means having open inner ends projecting transversely into the path of the airstream through the delivery means for the removal of material therefrom, each of said wing distribution outlets including an outer fixed tubular member and an inner tubular member arranged in telescoping relation within said outer tubular member, said inner tubular member including an upper slotted portion movable into the delivery means to intercept the flow of material therethrough.

19. In aerial dispensing apparatus according to claim 18, each of said wing distribution outlets further including means to adjustably control the extent of projection of the slotted portion of the said inner telescoping member into said delivery means.

20. In aerial dispensing apparatus for dispensing granular materials and the like from an aircraft, the combination comprising a material storage hopper disposed in the fuselage, delivery means including air discharge means adapted to force air under pressure from centrally beneath the hopper outwardly through the delivery means, said air discharge means including a ram air scoop having a lower, forwardly divergent entrance facing in the direction of flight and an upper forwardly convergent duct section extending centrally beneath said storage hopper, said upper and lower sections being interconnected by a generally U-shaped section whereby to cause the air passing rearwardly through the entrance to undergo an increase in velocity and a reversal in direction of flow for passage through the upper duct section, and transfer means between said storage hopper and said air discharge means to effect the controlled withdrawal of material from said hopper into said air discharge means.

References Cited

UNITED STATES PATENTS

| | | | |
|---|---|---|---|
| 1,580,301 | 4/1926 | Johnson | 244—136 |
| 2,098,887 | 11/1937 | Satterlee | 244—136 |
| 2,597,323 | 5/1952 | Hiller et al. | 244—136 |
| 3,204,895 | 9/1965 | Razak | 244—136 |

MILTON BUCHLER, Primary Examiner

JAMES E. PITTENGER, Assistant Examiner

U.S. Cl. X.R.

169—2; 239—171